US011458397B1

(12) United States Patent
Dills

(10) Patent No.: US 11,458,397 B1
(45) Date of Patent: *Oct. 4, 2022

(54) AUTOMATED REAL-TIME ENGAGEMENT IN AN INTERACTIVE ENVIRONMENT

(71) Applicant: Electronic Arts Inc., Redwood City, CA (US)

(72) Inventor: Thomas Bradley Dills, Longwood, FL (US)

(73) Assignee: Electronic Arts Inc., Redwood City, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/896,077

(22) Filed: Jun. 8, 2020

Related U.S. Application Data

(63) Continuation of application No. 16/115,274, filed on Aug. 28, 2018, now Pat. No. 10,709,983.

(51) Int. Cl.
*A63F 13/65* (2014.01)
*A63F 13/816* (2014.01)
*A63F 13/45* (2014.01)
*A63F 13/812* (2014.01)

(52) U.S. Cl.
CPC .............. *A63F 13/65* (2014.09); *A63F 13/45* (2014.09); *A63F 13/812* (2014.09); *A63F 13/816* (2014.09)

(58) Field of Classification Search
CPC .......... A63F 13/45; A63F 13/65; A63F 13/67; A63F 13/79; A63F 13/85; A63F 13/812; A63F 13/816; A63F 13/822
See application file for complete search history.

(56) References Cited

U.S. PATENT DOCUMENTS

| 10,491,943 | B1 * | 11/2019 | Wahlquist-Ortiz ........................ H04N 21/2187 |
| 10,709,983 | B1 * | 7/2020 | Dills ...................... A63F 13/812 |
| 10,747,805 | B1 * | 8/2020 | Bragdon ............. G06F 16/9038 |
| 2017/0021276 | A1 | 1/2017 | Chyou et al. |

FOREIGN PATENT DOCUMENTS

| JP | 2015-150111 A | 8/2015 |
| JP | 2015150111 A | * 8/2015 |

* cited by examiner

*Primary Examiner* — Jasson H Yoo
(74) *Attorney, Agent, or Firm* — McDermott Will & Emery LLP

(57) ABSTRACT

Various aspects of the subject technology relate to systems, methods, and machine-readable media for automated real-time engagement in an interactive environment. The method includes extracting events from a stream of data received from a service provider system, the stream of data comprising event information of one or more real-life sporting events. The method also includes selecting a subset of the events, the subset of the events comprising events that are engaging to a user. The method also includes generating engagement events for an interactive environment based on the subset of the events, each of the engagement events replicating a scenario that corresponds to an event of one of the one or more real-life sporting events. The method also includes sending the engagement events to a client device.

16 Claims, 6 Drawing Sheets

AUTOMATED REAL-TIME ENGAGEMENT IN AN INTERACTIVE ENVIRONMENT

CROSS-REFERENCE TO RELATED APPLICATION

This present application claims the benefit of priority under 35 U.S.C. § 120 as a continuation of U.S. patent application Ser. No. 16/115,274, filed Aug. 28, 2018, now allowed, the disclosure of which is hereby incorporated by reference in its entirety for all purposes.

BACKGROUND

Field

The present disclosure generally relates to a computer-operated multiplayer interactive environment, and more particularly to automated real-time engagement in an interactive environment.

Description of the Related Art

Video games, such as sports-themed and life simulation video games, provide ever increasing realistic game-playing experiences, including interactive environments where players can interact with one another during gameplay. In a video game, events are created to drive engagement to the video game. However, creation of the video game events is a manual and burdensome process.

SUMMARY

The disclosed system provides for producing a series of game challenges that replicate scenarios of a real-life event (e.g., a live professional sporting event), and soliciting users to engage the series of game challenges to win an in-game reward. The reward may be a coin award that may be linked to a user's game profile. In some aspects, an extraction server engine obtains a live feed from a service provider (e.g., a service provider system) of the real-life event and converts, on a periodic basis, the live feed into a parsed feed with a predetermined number of events (e.g., 100 events). The extraction server engine then feeds its output to a trained neural network, which then selects a subset of the predetermined number of events (e.g., picks the top 5 most engaging events out of the 100 events). The trained neural network feeds the selections to a game server engine, which then feeds the selected events as in-game event challenges to a game client for presentation to an end user.

According to one embodiment of the present disclosure, a computer-implemented method is provided. The method includes extracting events from a stream of data received from a service provider system, the stream of data comprising event information of one or more real-life sporting events. The method also includes selecting a subset of the events, the subset of the events comprising events that are engaging to a user. The method also includes generating engagement events for an interactive environment based on the subset of the events, each of the engagement events replicating a scenario that corresponds to an event of one of the one or more real-life sporting events. The method also includes sending the engagement events to a client device.

According to one embodiment of the present disclosure, a system is provided including a processor, and a memory comprising instructions stored thereon, which when executed by the processor, cause the processor to extract events from a stream of data received from a service provider system, the stream of data comprising event information of one or more real-life sporting events. The instructions also cause the processor to select a subset of the events, the subset of the events comprising events that are engaging to a user. The instructions also cause the processor to generate engagement events for an interactive environment based on the subset of the events, each of the engagement events replicating a scenario that corresponds to an event of one of the one or more real-life sporting events. The instructions also cause the processor to send the engagement events to a client device According to one embodiment of the present disclosure, a non-transitory computer readable storage medium is provided including instructions that, when executed by a processor, cause the processor to perform a method. The method includes extracting events from a stream of data received from a service provider system, the stream of data comprising event information of one or more real-life sporting events. The method also includes selecting a subset of the events, the subset of the events comprising events that are engaging to a user. The method also includes generating engagement events for an interactive environment based on the subset of the events, each of the engagement events replicating a scenario that corresponds to an event of one of the one or more real-life sporting events. The method also includes sending the engagement events to a client device.

According to one embodiment of the present disclosure, a system is provided that includes means for storing instructions, and means for executing the stored instructions that, when executed by the means, cause the means to perform a method. The method includes extracting events from a stream of data received from a service provider system, the stream of data comprising event information of one or more real-life sporting events. The method also includes selecting a subset of the events, the subset of the events comprising events that are engaging to a user. The method also includes generating engagement events for an interactive environment based on the subset of the events, each of the engagement events replicating a scenario that corresponds to an event of one of the one or more real-life sporting events. The method also includes sending the engagement events to a client device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
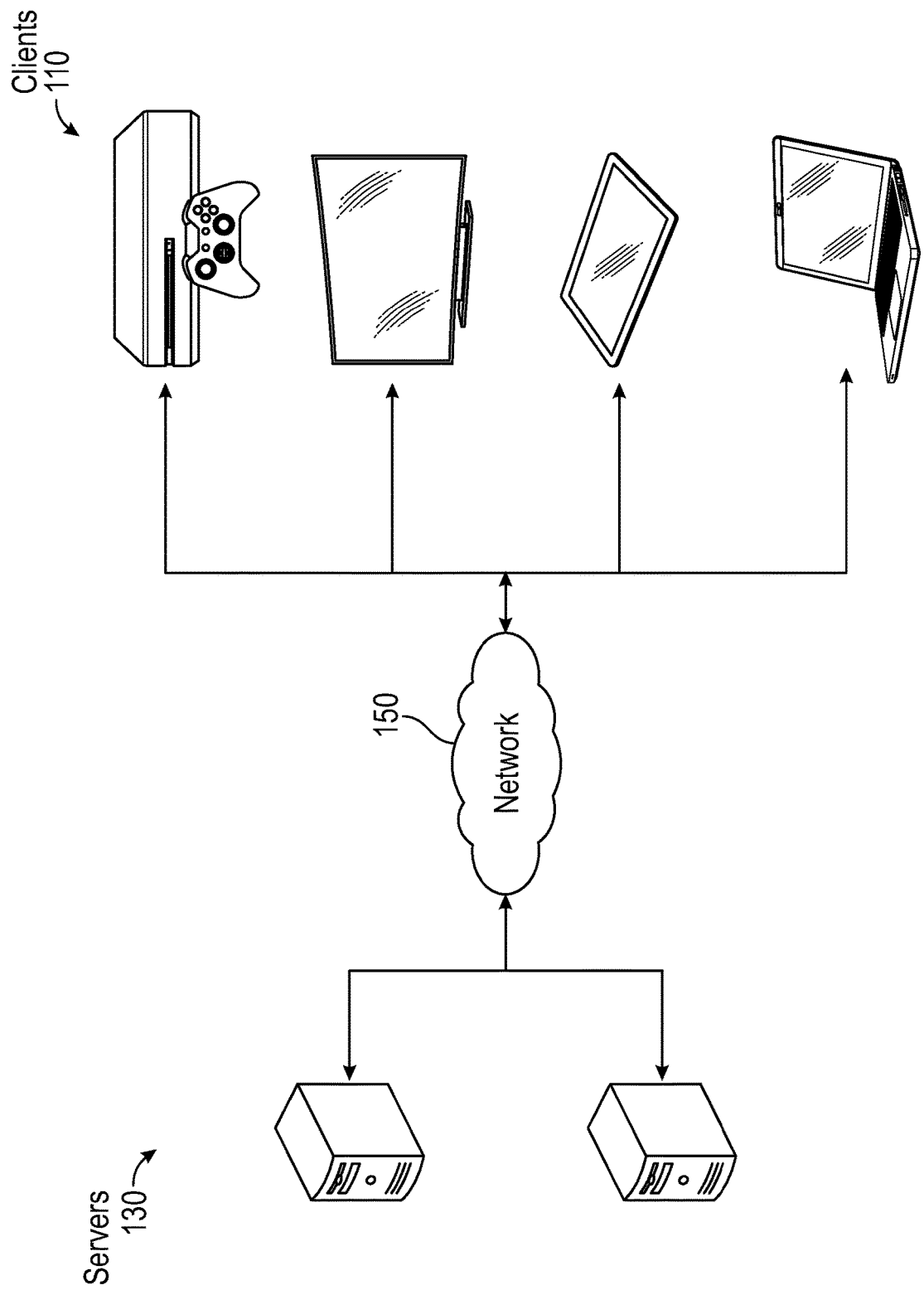
FIG. 1 illustrates an example architecture for distributed computing transactions through a proxy agent suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "interactive environment" may be used, for example, in reference to a video game or a simulated virtual game, and the term "game" may be interchangeably used with the term "interactive environment."

General Overview

Game players want to play challenges relevant to what is occurring in real life in a professional sporting event, such as the NFL. However, gameplay experiences are typically crafted by humans and take hours to days to craft. Given a stream of data that contains minute-by-minute real-time game activity (provided by the NFL), a system can be built that searches the stream for "interesting" events, such as touch downs, interceptions, important tackles, etc. An objective is to create challenges in an interactive environment that sets the game state (e.g., the field, the ball, the players, etc.) as they are set in real life and then challenge the user to accomplish the same goal that the real players have accomplished. Player engagement can be measured by determining which challenges appear most interesting to the players. Machine learning can be applied to the data to then select, from hundreds of potential events occurring each minute (e.g., on a busy Sunday evening), which events will be most engaging for players and present only those to the players. Player success can be measured and categorized based on player level to determine which challenges are most difficult for different players. Machine learning can be applied differently to customize which events are presented to which users again to optimize for the most engaging experience per user. For example, easy challenges are given to more novice players and harder challenges for more experienced players, but based on a per-player measurement of level and engagement, so the events each player interacts with is entirely customized for them and optimized for their enjoyment.

The disclosed system addresses a problem in traditional live simulation game systems that include interactive environments where users can interact with one another during gameplay, and tens of thousands of events are created for insertion into the gameplay where manual detection of events that are most engaging to a user can be burdensome. This is a problem specifically arising in the realm of computer technology. The problem is addressed by providing a solution also rooted in computer technology, namely, by introducing an artificial intelligence entity, such as a machine learning model or neural network model, that predicts which of the vast amounts of events are most engaging to a user to achieve the highest engagement between a user and the interactive environment that attempts to replicate gameplay of a real-life sporting event and reward the user at completion of the engagement.

Deep neural network learning techniques, such as convolutional neural networks, enable computing devices to observe, learn, and respond to a variety of input data (e.g., image, video, and audio streams and feeds, and the like) such that a computing device develops the ability identify objects, behaviors, words, patterns, or rules in an observed medium. The results and information of which can be back propagated into the neural network to improve deterministic logic for selecting the most appropriate, efficient, and effective response. Such convolutional neural networks can be applied to automate the real-time engagement in an interactive environment.

The disclosed system includes training of a series of computer-operated neural networks, such as a convolutional neural network, to teach the neural network to identify which events associated with a real-life sporting event are most engaging to a user. In certain aspects, the convolutional neural network is operated on a server and accesses large amounts of sporting event data and interaction data stored in memory of the server or stored elsewhere and accessible by the server in order to train the convolutional neural network.

Although many examples provided herein describe a user's inputs being identifiable (e.g., a user's transactional history identifying the user's interactions with the interactive environment), or gameplay history, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for interactive computer-operated agents for user engagement in an interactive environment suitable for practicing some implementations of the disclosure. The architecture 100 includes one or more servers 130 and clients 110 connected over a network 150.

One of the many servers 130 is configured to host virtual-world data, such as virtual-world data corresponding to a life simulation. One of the many servers 130 is also configured to host a computer-operated neural network. The neural network, which can be a convolutional neural network, is trained to predict which of a predetermined number of events from a live game data stream are most engaging to a user.

For purposes of load balancing, multiple servers 130 can host the real-world data. The server 130 may further be configured to host simulations for multiple clients 110. For example, the server 130 may host a multiplayer simulation for multiple clients 110 to connect to, such that the multiple clients 110 experience the same simulation at approximately the same time.

The clients 110 include one or more computing devices. The clients 110 may include devices capable of running a simulation engine, such as a sports game, for simulating sporting events. For example, the clients 110 may include stationary video game consoles, tablets, mobile devices, laptop computers, desktop computers, and/or other devices capable of running a sports-themed video game.

The disclosed system uses real-world data from one or more live events to drive a game simulation where users interact with the content that replicates scenarios of the one or more live events. The server 130 sends game data to one or more clients 110, which uses the game data in generating and running a live sporting event simulation. As such, the disclosed system can, for example, create a fairly accurate simulation of real-life events without requiring a complete digitizing of the real-life event, or an extensive reconfiguration of a simulation engine.

The servers 130 can be any device having an appropriate processor, memory, and communications capability for hosting real-world data. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example Automated Real-Time Interactive Environment Engagement

Figure 2:
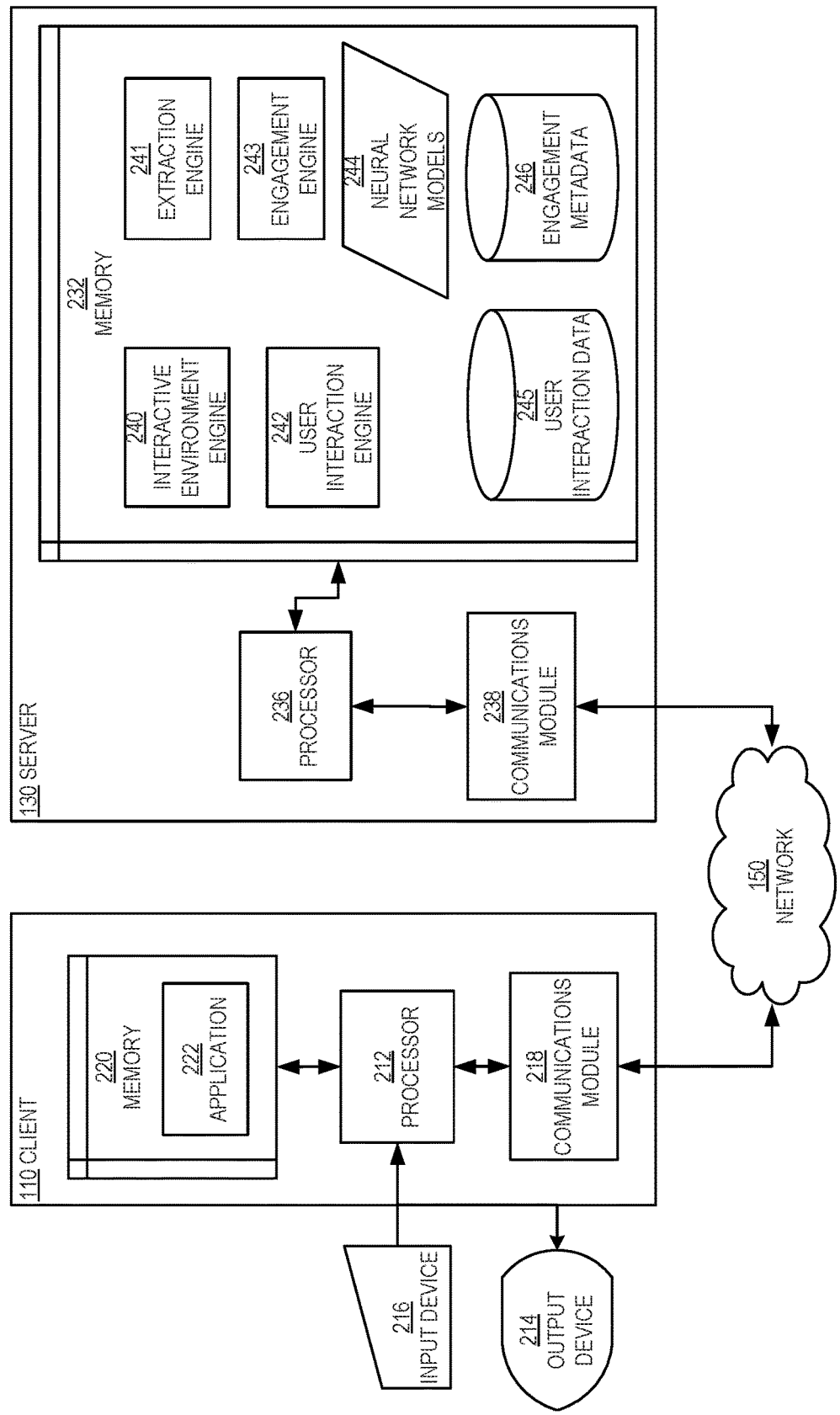
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes an interactive environment engine 240, a user interaction engine 242, an engagement engine 243, and neural network models 244. The processor 236 of the server 130 is configured to execute instructions, such as instructions physically coded into the processor 236, instructions received from software in the memory 232, or a combination of both.

The interactive environment engine 240 is a processing computing circuit configured to execute gameplay of the interactive environment based on one or more game states. The interactive environment engine 240 may transition between game states in response to occurrence of an event in the interactive environment and/or in response to user input through the application 222 of the client 110. In some aspects, the interactive environment engine 240 is communicably coupled to the user interaction engine 242, the engagement engine 243, and the neural network models 244. The interactive environment engine 240 has access to the user interaction data 245 and the engagement metadata 246 based on the one or more game states. In some examples, the game states represent interactive objects and their respective status in a live game simulation (e.g., the field, the ball, the players, etc.).

In one or more implementations, the neural network models 244 may be a series of neural networks, one neural network for each user type classification. As discussed herein, the neural network models 244 are a type of feed-forward artificial neural network where individual neurons are tiled in such a way that the individual neurons respond to overlapping regions in a visual field. The architecture of the neural network models 244 may be in the object of existing well-known machine learning architectures such as AlexNet, GoogLeNet, or Visual Geometry Group models. In one or more implementations, each of the neural network models 244 consists of a stack of convolutional layers followed by a single fully connected layer. In this respect, the fully connected layer is the layer that maps the convolutional features to one of a plurality of training classes. The neural network models 244 can include a loss layer (e.g., softmax or hinge loss layer) to back propagate errors so that the neural network models 244 learns and adjusts its weights to better fit provided input data.

In one or more implementations, the neural network models 244 represent respective configurations that utilize input parameters, and translate them to a corresponding prediction that indicates the most engaging events for a given user type. In this respect, the configurations can yield different sets of most engaging events given a set of attributes for the given user type. The neural network models 244 provide an output dataset indicating the most engaging events for a given type of user as the engagement metadata 246. The engagement metadata 246 may include multiple datasets that respectively represent different types of most engaging events for different types of users. Each of the engagement datasets may correspond to a particular neural network model, and may be indexed by an identifier of the corresponding neural network model and/or an identifier corresponding to a type of user.

Also included in the memory 232 of the server 130 is the interaction data 245. In certain aspects, the processor 236 is configured to determine the interaction data 245 by obtaining user interaction data identifying interactions between user-controlled agent and computer-operated agents. For example, the processor 236, using the user interaction engine 242, measures a number of interactions between a user and a specific type of event, where the number of interactions is measured for each class of users. The user interaction engine 242 provides the measured interactions as user interaction data 245. In this respect, the interaction data 245 may include measurements indicating a number of interactions initiated by a type of user for a specific engagement event, or a number of interactions initiated by a user for different types of engagement events. The processor 236 may keep track of the user interactions over a given time period.

The memory 232 also includes engagement metadata 246. The engagement metadata 246 may include data relating to peer-to-peer transactions including historical transaction data obtained (or collected) through the proxy agent for a given item associated with the computer-operated multi-player game. In one or more implementations, the item metadata 244 includes global and local parameters for use by the electronic acquisition engine 241, the listing engine 242 and the relisting engine 243.

The device 110 includes a processor 212, the communications module 218, and the memory 220 that includes the application 222. The application 222 may be a simulation engine, or physically coded instructions that execute a simulation of a themed event, such as a sports-themed video game, a real-world life simulation video game, a first-person shooter video game, or the like. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in the memory 220, or a combination of both. The processor 212 of the device 110 executes instructions from the application 222 causing the processor 212 to run the sports-themed video game and provide access to an online trans-action repository, where content items such as digital trading cards associated with the sports-themed video game can be purchased, sold, auctioned or exchanged with other participants in the sports-themed video game through the server 130.

In an interactive environment (e.g., the sports-themed game), live events are created to drive engagement to the interactive environment. In some examples, eight or ten live events are created per day. However, a vast number of events can happen in a real-life game in a short duration of time, so it is difficult for an algorithm to determine which events that happen in the real-life game would be interesting to a user. In many aspects, the live events are created manually, and a scenario may be produced where a user (e.g., game player) is solicited to run for 30 yards or solicited to run for a touchdown from a certain place on the field. However, this manual process of detecting and producing in-game events is a very burdensome process. Moreover, better engagement with users can be achieved if events are created more directly related as to what is going on in a real-life game. For example, the created event is intended to correspond to a live event that occurred in the real-life sporting event. In this regard, a measure of enjoyment can be determined from the real-life sporting event. In an approach, the events are provided to multiple users to determine which events are more engaging (e.g., more enjoyable) to users. The results of the testing can help produce an algorithm (or model) to decide which of the events are more interesting, more winnable, more engaging, more playable, etc., to the users. Based on the results, the interactive environment containing the events that are working (or causing greater engagement as decided by the algorithm) is widely distributed in an automated manner.

The processor 236, through the communications module 238, establishes a connection with a remote server (not shown) associated with a service provider (e.g., a service provider system) of live sporting event information through an application programming interface (not shown). The processor 236, using an extraction engine 241 as a computing circuit, pulls a raw data stream (e.g., a live feed) provided by a service provider (e.g., a professional sporting event organization) through the application programming interface at a predetermined data rate. Depending on the data rate, a certain of amount of data is pulled. There may be a terms of service that define how frequently the processor 236 is allowed to pull the data from the service provider remote server. In some aspects, the raw data stream is pulled periodically (e.g., every 30 seconds). In some aspects, a new raw feed may be supplied from the service provider remote server during (and/or) after the real-life sporting events take place. The processor 236, using the extraction engine 241, converts the live stream of data into events in real-time (or near real-time) that are intended to produce a game session (e.g., challenge) in the interactive environment.

In some implementations, the live stream of data is an RSS feed, for example, that includes a digital representation of events in a live game. The data pulled may be an XML document that includes the live game information such as box score data, play by play, metadata about every play that happens in all of the live football games.

The processor 236, using the extraction engine 241, obtains the feed from the service provider and chooses certain kinds of events out of the feed, and creates events in the interactive environment using the engagement engine 243. The processor 236, using the engagement engine 243, uses the live stream to generate multiple events (e.g., 400 events) on the server 130. During an offline process, the processor 236, using the engagement engine 243, obtains engagement data from users (e.g., 40000 users) that interacted with the events. With the input data such as the live game information and the output engagement data, the processor 236 can instantiate a neural network model that selects, based on similar inputs, which events would create the best engagement with the interactive environment.

The processor 236, using an extraction engine 241, extracts a predetermined number of events from the raw stream. The processor 236, using an extraction engine 241, parses the XML document by identifier labels that correspond to different types of metadata as part of the extraction process. The extraction process can identify the outcome of a play and/or sporting event in order to define a successful outcome for the game challenge.

In obtaining the engagement data, the processor 236, using the engagement engine 243, categorizes users based on several indicators, such as which users won the event challenge, which users lost the event challenge, how many users won, how many users lost, and of those users, how many users logged back in after the advertising duration (or how many users logged back in the next day or subsequent time). Other indicators for the engagement data may include user spending of virtual currency, the length of time a user is logged in and interacting with the interactive environment (e.g., how long the player plays each day), user feedback in surveys (e.g., sentiment given in satisfaction surveys), etc.

Once there is a trained neural network, the processor 236 takes the extracted feed to generate a subset number of events using the engagement engine 243. The neural network models 244 can be used to select which of the total events are most engaging to a user (e.g., satisfy an engagement threshold). For example, the neural network models 244 can predict which events are most likely to exceed the engagement threshold such that those that exceed the engagement threshold are considered as the most engaging events to a user. In some aspects, the engagement threshold may be a different value for each type (or classification) of user. In some implementations, the processor 236, using the engagement engine 243, determines a scoring metric for each of the detected interactions based on the obtained interaction data. In this respect, the processor 236 can prioritize the detected interactions based on corresponding scoring metrics. The processor 236, using the neural network models 244, determines which of the detected interactions are determined as the most engaging to a user based on a comparison between the corresponding scoring metrics and the engagement threshold.

In some aspects, the processor 236, using the extraction engine 241, converts the live feed into a predetermined number of events (e.g., 100 events) on a periodic basis, then the processor 236 feeds the output to a trained neural network model (e.g., 244), which is trained to select a subset number of the total number of events (e.g., pick the top 5 most engaging events out of the 100 events). In some aspects, the neural network models 244 are retrained using historical engagement data. The processor 236 then feeds the output prediction from the neural network models 244 back to the interactive environment engine 240, which then feeds it to the application 222 on the client 110 (e.g., game client) to present to the end user. The training of the neural network models 244 and data collection such as the user interaction data 245 are performed offline.

The processor 236, using the interactive environment engine 240, can generate a game scenario similar to the scenario that occurred in the real-life game using the corresponding live game information. The processor 236, using an extraction engine 241, extracts the play data corresponding to a scenario from the real-life game obtained from the live feed. The scenario may be a situation of a football game where a certain down began at a certain yard line, and the play ended with a touchdown. The processor 236, using the interactive environment engine 240, recreates the same scenario, for example, by placing the user in the same stadium and team with the same opposing team on that particular yard line. An engagement event (e.g., a game challenge) would solicit the user by notifying the user of a game challenge (e.g., Run for a Touchdown like the professional quarterback player did 5 minutes ago in the real-life game) and prompts the user to accept the game challenge to win a reward (e.g., a coin award) at the completion of the game challenge. If the user succeeds in the first try, then the user can win a predetermined number of coins (e.g., 500 coins). In this respect, the processor 236, using the engagement engine 243, can associate the user's profile with the reward so that the user's game account can be updated with the coin award. In some aspects, the processor 236, using the user interaction engine 242, updates the user interaction data 245 to include the outcome of an interaction with an engagement event (e.g., reflect that the user successfully completed the game challenge, or reflect that the user did not complete the game challenge successfully).

Based on usage patterns, the interactive environment usage levels increase during commercial (or advertisement) breaks of the real-life sporting event. The processor 236, using the interactive environment engine 240, can generate and send notifications during these periods of time noted as a downtime of the real-life sporting event. For example, the processor 236 processes a user graph to determine which periods of a real-life sporting event is a time to present a notification to users to initiate play of the game challenge through the application 222 of the client 110. The notifications would solicit the user to interact with the engagement event in the interactive environment (e.g., play the mobile game to complete a game challenge) by recreating a real-life game scenario and winning a reward at its completion.

In some implementations, the application 222 (or native application) associated with a game platform (e.g., mobile gaming system, console gaming system) produces a series of game challenges locally that replicate scenarios that correspond to events of a real-life sporting event, and solicits users to engage the series of game challenges to win a reward. The reward may be a coin award that gets associated with a user's game profile stored locally on the client 110. In this implementation, the client 110 receives game state information from the server 130 that includes information for rendering the interactive environment and engagement information provided by the interactive environment engine 240.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
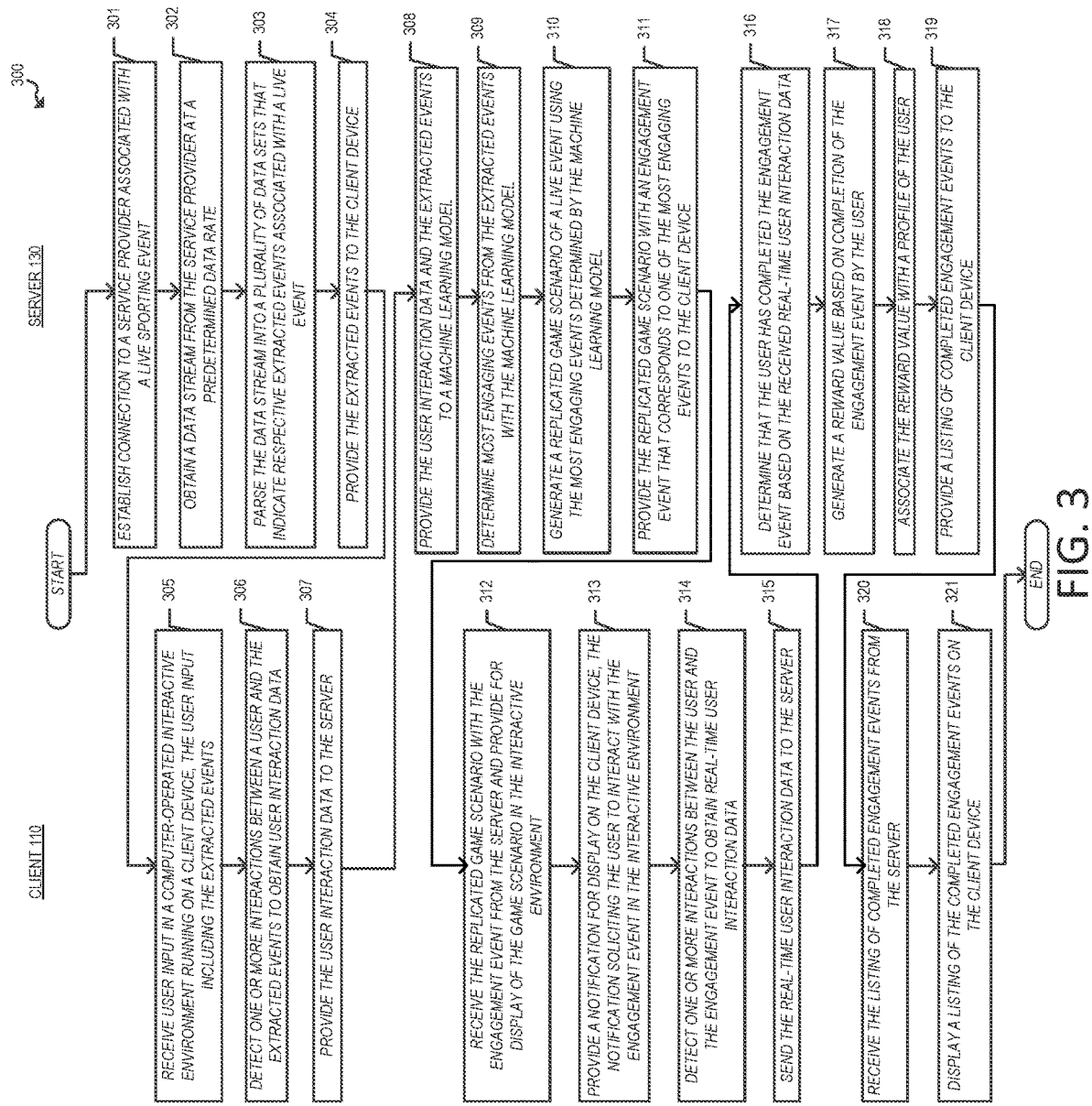
FIG. 3 illustrates an example process of automating real-time engagement in an interactive environment using the example client and server of FIG. 2.

FIG. 3 illustrates an example process of automating real-time engagement in an interactive environment using the example client and server of FIG. 2. Further for explanatory purposes, the blocks of the sequential process 300 are described herein as occurring in serial, or linearly. However, multiple blocks of the process 300 may occur in parallel. In addition, the blocks of the process 300 need not be performed in the order shown and/or one or more of the blocks of the process 300 need not be performed. While FIG. 3 is described with reference to FIG. 2, it should be noted that the process steps of FIG. 3 may be performed by other systems.

The process 300 begins in step 301 where the server 130 establishes a connection to a service provider associated with a live sporting event. For example, the service provider may be an entity associated with a professional football league such as the NFL. Other service providers that represent other live sporting events may be connected to by the server 130 in other implementations.

Next, in step 302, the server 130 obtains a data stream from the service provider at a predetermined data rate. Subsequently, at step 303, the server 130 parses the data stream into a plurality of data sets that indicate respective extracted events associated with a live event such as a live football game. In step 304, the server 130 provides the extracted events to the client 110.

In step 305, the client 110 receives the extracted events provided by the server 130 in a computer-operated interactive environment running on the client 110. Next, in step 306, the client 110 detects one or more interactions between a user and the extracted events to obtain user interaction data. Subsequently, at step 307, the client 110 provides for transmission the user interaction data to the server 130.

Now turning back to the server 130, in step 308, the server 130 provides the user interaction data and the extracted events to a machine learning model. The machine learning model may be a trained neural network configured to predict most engaging events to a user. Subsequently, in step 309, the server 130 determines the most engaging events among the extracted events with the machine learning model. Next, at step 310, the server 130 generates a replicated game scenario of a live event using the most engaging events determined by the machine learning model. Subsequently, at step 311, the server 130 provides the replicated game scenario with an engagement event that corresponds to one of the most engaging events to the client 110.

Now turning back to the client 110, in step 312, the client 110 receives the replicated game scenario with the engagement event from the server 130 and provides for display the game scenario in the interactive environment. Next, in step 313, the client 110 provides a notification for display on the client 110. The notification solicits the user to interact with the engagement event in the interactive environment. In step 314, the client 110 detects one or more interactions between the user and the engagement event to obtain real-time user interaction data. Subsequently, in step 315, the client 110 provides, for transmission, the real-time user interaction data to the server 130.

Turning back to the server 130, in step 316, the server 130 determines that the user has completed the engagement event based on the received real-time user interaction data. Next, in step 317, the server 130 generates a reward value based on completion of the engagement event by the user. Subsequently, in step 318, the server 130 associates the reward value with a profile of the user. In step 313, the server 130 provides a listing of completed engagement events to the client 110.

In step 320, the client receives the listing of completed engagement events from the server 130. Subsequently, in step 321, the client 110 displays the listing of completed engagement events via the application 222 of the client 110.

Figure 4:
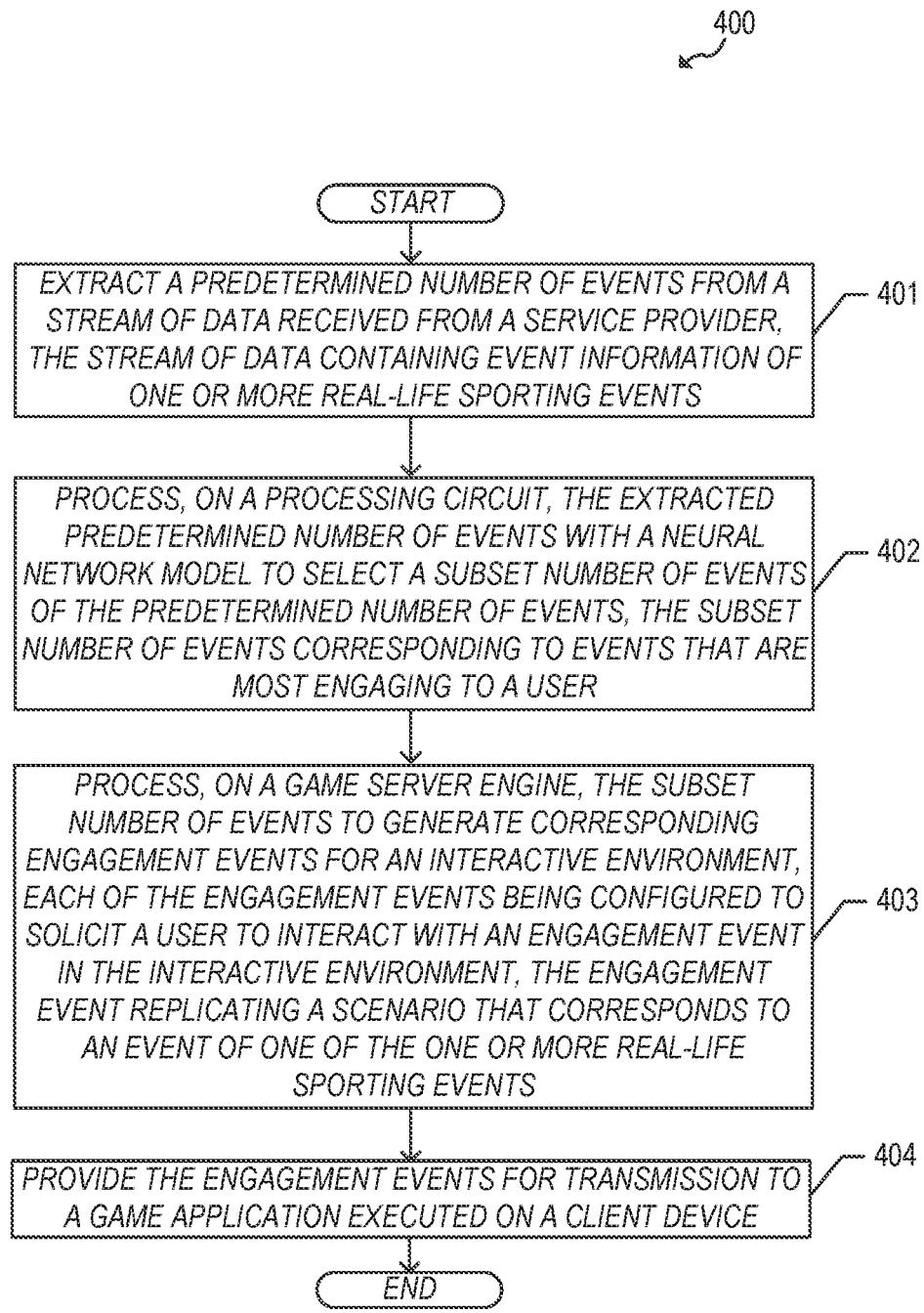
FIG. 4 illustrates an example process of automating real-time engagement in an interactive environment using the example server of FIG. 2.

FIG. 4 illustrates an example process 400 of automating real-time engagement in an interactive environment using the example server of FIG. 2. Further for explanatory purposes, the blocks of the sequential process 400 are described herein as occurring in serial, or linearly. However, multiple blocks of the process 400 may occur in parallel. In addition, the blocks of the process 400 need not be performed in the order shown and/or one or more of the blocks of the process 400 need not be performed.

The process 400 begins in step 401 where the processor 236 of the server 130, using the extraction engine 241 and the engagement engine 243, extracts a predetermined number of events from a stream of data received from a service provider associated with a live sporting event (e.g., NFL, MLB, NBA, NHL, FIFA, etc.). In some aspects, the stream of data contains event information of one or more real-life sporting events (e.g., football game, baseball game, basketball game, hockey game, soccer match, etc.).

Next, in step 402, the processor 236 processes the extracted predetermined number of events with a neural network model (e.g., 244) to select a subset number of events of the predetermined number of events. In some aspects, the subset number of events corresponds to events that are most engaging to a user. Subsequently, at step 403, the processor 236, using the interactive environment engine 240, processes the subset number of events to generate corresponding engagement events for an interactive environment (e.g., a live game simulation). In some aspects, each of the engagement events is configured to solicit a user to interact with the engagement event in the interactive environment. The engagement event replicates a scenario that corresponds to an event of one of the real-life sporting events (e.g., provide a scenario where user can recreate a touchdown drive late in the fourth quarter from a particular yard line for a chance to win a reward). Next, at step 404, the processor 236 provides the engagement events for transmission to the application 222 executed on the client 110.

Figure 5A:
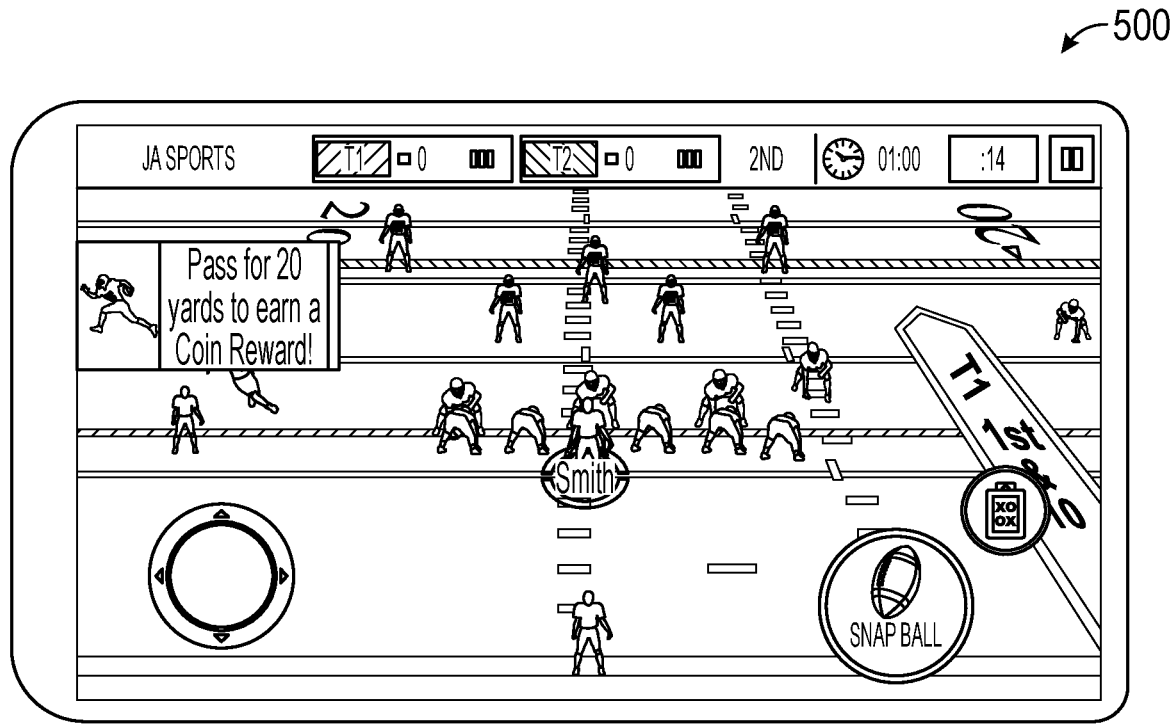
FIGS. 5A and 5B illustrate examples of a user interface depicting the automated real-time engagement in an interactive environment according to certain aspects of the disclosure.
Figure 5B:
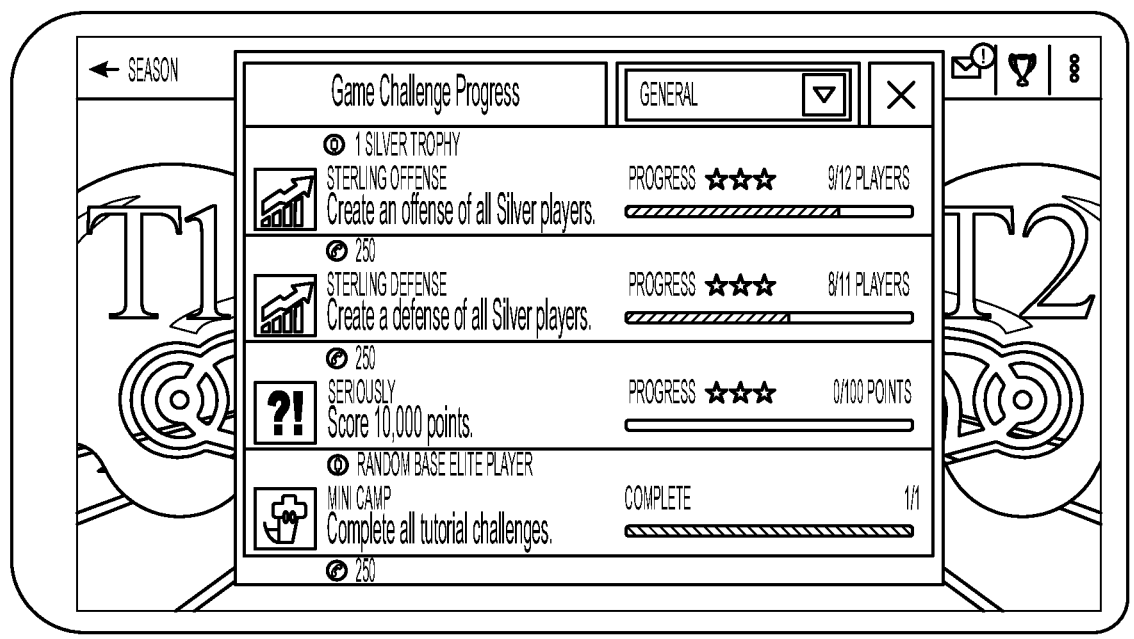

FIGS. 5A and 5B illustrate examples of a user interface depicting the automated real-time engagement in an interactive environment for practicing the example processes of FIGS. 3 and 4 via the application 222 of the client 110. In particular, FIG. 5A illustrates a user interface 500 that depicts a representation of an interactive environment including an engagement event (e.g., game challenge) prompting a user to interact with the interactive environment in accordance with the engagement event. In the depicted example of FIG. 5A, a notification of the engagement event is provided for display that reads "Pass for 20 yards to earn a Coin Reward!" The notification alerts the user during the gameplay to initiate and complete the game challenge. For example, the engagement event may solicit the user to provide a certain input that causes a gameplay action in the interactive environment. In this respect, the user may provide input that causes a first user-controlled agent (e.g., football quarterback) to make a pass to a second user-controlled agent (e.g., football wide receiver) for at least 20 yards. If the user successfully completes the game challenge, then the user wins the advertised reward value. This game challenge helps promote greater engagement with the interactive environment, especially when the game challenge mimics events of real-life sporting events.

FIG. 5B illustrates a user interface 550 that depicts a landing page of the interactive environment with a listing of engagement events and their respective status (e.g., the progress of each game challenge). For example, the user interface 550 includes a table listing of game challenge progress, where multiple game challenges promoted to the user have a history of on-going interactions and/or completed interactions. The table listing of the game challenge progress can help the user determine which game challenges are still active and which of the active game challenges are near completion. In other aspects, the listing of game challenge progress helps promote greater engagement with the interactive environment by listing the most engaging events to a user that are accessible to the user for interaction. For example, the subject system can provide a listing of new game challenges that recreate scenarios of touchdown drives from multiple football games on a given game day. In this respect, the user interface 550 may provide for display a listing of such most engaging game challenges to a user to keep that user engaged with the interactive environment as much as possible. The user interface 550 may be updated with a new listing for each new live sporting event in an automated manner and/or in response to the user triggering recreation of a new listing using a new live feed from the service provider.

Hardware Overview

Figure 6:
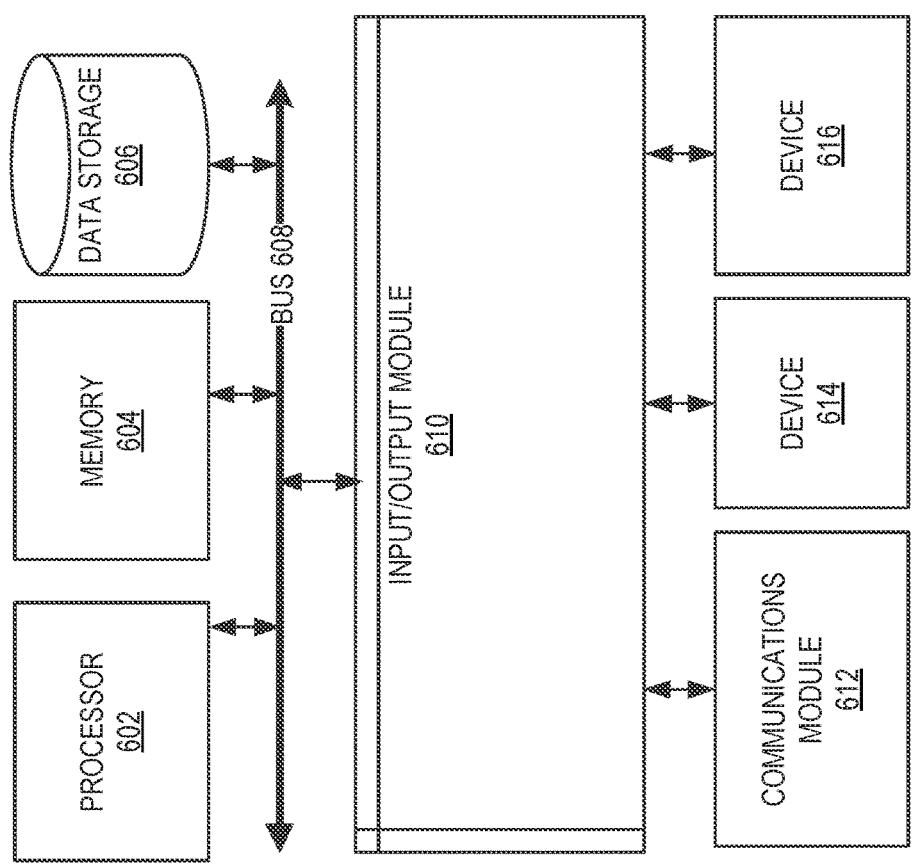
FIG. 6 is a block diagram illustrating an example computer system with which the client and server of FIG. 2 can be implemented.

FIG. 6 is a block diagram illustrating an exemplary computer system 600 with which the client 110 and server 60 of FIG. 1 can be implemented. In certain aspects, the computer system 600 may be implemented using hardware or a combination of software and hardware, either in a dedicated server, integrated into another entity, or distributed across multiple entities.

Computer system 600 (e.g., client 110 and server 60) includes a bus 608 or other communication mechanism for communicating information, and a processor 602 (e.g., processor 212 and 236) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 (e.g., communications modules 218 and 238) include networking interface cards, such as Ethernet cards and modems. In certain aspects, the input/output module 610 is configured to connect to a plurality of devices, such as an input device 614 (e.g., input device 216) and/or an output device 616 (e.g., output device 214). Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as a LCD (liquid crystal display) monitor, for displaying information to the user.

According to one aspect of the present disclosure, the client 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   extracting events from a stream of data received from a service provider system, the stream of data comprising event information of one or more real-life sporting events;
   selecting a subset of the events, the subset of the events comprising events that are predicted to be engaging to a user associated with a user game profile;
   generating engagement events for an interactive environment based on the subset of the events, each of the engagement events replicating a scenario that corresponds to an event of one of the one or more real-life sporting events;
   training a neural network model with historical interaction data to predict a subset number of events that are predicted to be engaging to a user;
   segmenting a plurality of users into a plurality of classes of users based on historical interaction data;
   training a different neural network model for each of the plurality of classes of users with the historical interaction data to predict a predetermined number of events that are most engaging to a user of one of the plurality of classes of users;
   sending the engagement events to a client device of the user;
   causing display of the engagement event through a user interface of the client device; and
   linking a reward to the user game profile upon completion of the engagement event.

2. The computer-implemented method of claim 1, further comprising:
   establishing a connection with the service provider system through an application programming interface; and pulling the stream of data through the application programming interface at a predetermined data rate,
wherein the stream of data is pulled periodically.

3. The computer-implemented method of claim 1, further comprising:
detecting one or more interactions between a user and at least one of the events in the interactive environment;
obtaining interaction data from the detected one or more interactions;
determining a scoring metric for each of the detected one or more interactions based on the obtained interaction data;
prioritizing the detected one or more interactions based on corresponding scoring metrics; and
determining which of the detected one or more interactions are determined as the most engaging to a user based on a comparison between the corresponding scoring metrics and a predetermined engagement threshold.

4. The computer-implemented method of claim 3, further comprising:
generating a neural network model that is configured to predict a subset number of events that are most engaging to a user based on user segmentation data and the obtained interaction data.

5. The computer-implemented method of claim 1, further comprising:
generating one or more engagement events based on the event information of the one or more real-life sporting events, wherein each of the one or more engagement events includes a representation of a game scenario that is similar to a scenario that occurred in one of the one or more real-life sporting events using corresponding live game information.

6. The computer-implemented method of claim 1, further comprising:
processing, on a processing circuit, a user graph indicating usage patterns of users during a broadcast of a real-life sporting event to determine which time periods of the real-life sporting event is a time to provide a notification to users to initiate gameplay of an engagement event through the interactive environment.

7. A system, comprising:
a processor; and
a memory comprising instructions stored thereon, which when executed by the processor, cause the processor to:
extract events from a stream of data received from a service provider system, the stream of data comprising event information of one or more real-life sporting events;
select a subset of the events, the subset of the events comprising events that are predicted to be engaging to a user associated with a user game profile;
generate engagement events for an interactive environment based on the subset of the events, each of the engagement events replicating a scenario that corresponds to an event of one of the one or more real-life sporting events;
train a neural network model with historical interaction data to predict a subset number of events that are predicted to be engaging to a user;
segment a plurality of users into a plurality of classes of users based on historical interaction data;
train a different neural network model for each of the plurality of classes of users with the historical interaction data to predict a predetermined number of events that are most engaging to a user of one of the plurality of classes of users;
send the engagement events to a client device of the user;
cause display of the engagement event through a user interface of the client device; and
linking a reward to the user game profile upon completion of the engagement event.

8. The system of claim 7, wherein the instructions stored thereon, which when executed by the processor, cause the processor to:
establish a connection with the service provider system through an application programming interface; and
pull the stream of data through the application programming interface at a predetermined data rate,
wherein the stream of data is pulled periodically.

9. The system of claim 7, wherein the instructions stored thereon, which when executed by the processor, cause the processor to:
generate a neural network model that is configured to predict a subset number of events that are most engaging to a user based on user segmentation data and historical interaction data.

10. The system of claim 7, wherein the instructions stored thereon, which when executed by the processor, cause the processor to:
detect one or more interactions between a user and at least one of the events in the interactive environment;
obtain interaction data from the detected one or more interactions;
determine a scoring metric for each of the detected one or more interactions based on the obtained interaction data;
prioritize the detected one or more interactions based on corresponding scoring metrics; and
determine which of the detected one or more interactions are determined as the most engaging to a user based on a comparison between the corresponding scoring metrics and a predetermined engagement threshold.

11. The system of claim 7, wherein the instructions stored thereon, which when executed by the processor, cause the processor to:
generate one or more engagement events based on the event information of the one or more real-life sporting events, wherein each of the one or more engagement events includes a representation of a game scenario that is similar to a scenario that occurred in one of the one or more real-life sporting events using corresponding live game information.

12. The system of claim 7, wherein the instructions stored thereon, which when executed by the processor, cause the processor to:
process, on a processing circuit, a user graph indicating usage patterns of users during a broadcast of a real-life sporting event to determine which time periods of the real-life sporting event is a time to provide a notification to users to initiate gameplay of an engagement event through the interactive environment.

13. A non-transitory computer readable storage medium is provided including instructions that, when executed by a processor, cause the processor to perform a method, the method comprising:
extracting events from a stream of data received from a service provider system, the stream of data comprising event information of one or more real-life sporting events;

selecting a subset of the events, the subset of the events comprising events that are predicted to be engaging to a user associated with a user game profile;
generating engagement events for an interactive environment based on the subset of the events, each of the engagement events replicating a scenario that corresponds to an event of one of the one or more real-life sporting events;
training a neural network model with historical interaction data to predict a subset number of events that are predicted to be engaging to a user;
segmenting a plurality of users into a plurality of classes of users based on historical interaction data;
training a different neural network model for each of the plurality of classes of users with the historical interaction data to predict a predetermined number of events that are most engaging to a user of one of the plurality of classes of users;
sending the engagement events to a client device of the user;
causing display of the engagement event through a user interface of the client device; and
linking a reward to the user game profile upon completion of the engagement event.

14. The non-transitory computer readable storage medium of claim 13, wherein the method further comprises:
detecting one or more interactions between a user and at least one of the events in the interactive environment;
obtaining interaction data from the detected one or more interactions;
determining a scoring metric for each of the detected one or more interactions based on the obtained interaction data;
prioritizing the detected one or more interactions based on corresponding scoring metrics; and
determining which of the detected one or more interactions are determined as the most engaging to a user based on a comparison between the corresponding scoring metrics and a predetermined engagement threshold.

15. The non-transitory computer readable storage medium of claim 13, wherein the method further comprises:
generating one or more engagement events based on the event information of the one or more real-life sporting events, wherein each of the one or more engagement events includes a representation of a game scenario that is similar to a scenario that occurred in one of the one or more real-life sporting events using corresponding live game information.

16. The non-transitory computer readable storage medium of claim 13, wherein the method further comprises:
processing, on a processing circuit, a user graph indicating usage patterns of users during a broadcast of a real-life sporting event to determine which time periods of the real-life sporting event is a time to provide a notification to users to initiate gameplay of an engagement event through the interactive environment.

* * * * *